United States Patent
Habel et al.

(10) Patent No.: US 8,199,317 B2
(45) Date of Patent: Jun. 12, 2012

(54) REINFORCEMENT ELEMENT WITH SENSOR FIBER, MONITORING SYSTEM, AND MONITORING METHOD

(75) Inventors: Wolfgang Habel, Berlin (DE); Katerina Krebber, Stahnsdorf (DE); Elke Thiele, Chemnitz (DE); Rolf Arnold, Chemnitz (DE); Rainer Glötzl, Rheinstetten (DE)

(73) Assignee: Bundesanstalt für Materialforschung und -Prüfung (BAM), Berlin (DE)

( * ) Notice: Subject to any disclaimer, the term of this patent is extended or adjusted under 35 U.S.C. 154(b) by 606 days.

(21) Appl. No.: 12/301,222

(22) PCT Filed: May 16, 2007

(86) PCT No.: PCT/EP2007/004392
§ 371 (c)(1), (2), (4) Date: Apr. 29, 2009

(87) PCT Pub. No.: WO2007/131794
PCT Pub. Date: Nov. 22, 2007

(65) Prior Publication Data
US 2009/0303460 A1 Dec. 10, 2009

(30) Foreign Application Priority Data
May 17, 2006 (DE) .......................... 10 2006 023 588

(51) Int. Cl.
G01B 11/16 (2006.01)
(52) U.S. Cl. ......................................... 356/32
(58) Field of Classification Search ...................... 356/32
See application file for complete search history.

(56) References Cited

U.S. PATENT DOCUMENTS 7,245,790 B2 * 7/2007 Brown et al. ................... 385/12
2002/0020224 A1 2/2002 Sato et al.
2005/0213869 A1 * 9/2005 Brown et al. ................... 385/12
2006/0050744 A1 * 3/2006 Wong et al. ...................... 372/3
2006/0285850 A1 * 12/2006 Colpitts et al. ............... 398/108

FOREIGN PATENT DOCUMENTS

JP 11 304549 A 11/1999
WO 2005/114226 A 12/2005

OTHER PUBLICATIONS

International Search Report for International Application No. PCT/EP2007/004392 dated Jan. 23, 2008.
K. Hotate et al., "Distributed Fiber Brillouin Strain Sensing With 1-cm Spatial Resolution by Correlation-Based Continuous-Wave Technique", IEEE Photonics Technology Letters, IEEE Service Center, Piscataway, NJ, US, vo. 14, No. 2, Feb. 2002.

* cited by examiner

*Primary Examiner* — Michael P Stafira
(74) *Attorney, Agent, or Firm* — Sughrue Mion, PLLC (57) ABSTRACT

A reinforcement element, comprises at least one sensor fiber adapted for strain measurements based on stimulated Brillouin scattering within said sensor fiber. Furthermore, a system for monitoring strain within a structure comprises a reinforcement element comprising at least one sensor fiber adapted for strain measurements based on stimulated Brillouin scattering within said sensor fiber, a pump laser for coupling in laser radiation of a pump frequency into said at least one sensor fiber, a Stokes laser for coupling in laser radiation of a Stokes laser radiation into said at least one sensor fiber, wherein the pump frequency and the Stokes frequency are different from one another and wherein the frequency difference between the pump and Stokes frequencies is within the range of acoustical phonons within said sensor fiber, a sensor adapted to obtain a stimulated Brillouin backscattering signal, and a network analyzer adapted for determining the complex transfer function of the sensor fiber to determine a spatially resolved strain measurement.

21 Claims, 10 Drawing Sheets

REINFORCEMENT ELEMENT WITH SENSOR FIBER, MONITORING SYSTEM, AND MONITORING METHOD

BACKGROUND OF THE INVENTION

The present invention relates to a reinforcement element with a sensor fiber, monitoring system utilizing the reinforcement element, and a monitoring method adapted for the system.

Reinforcement elements are widely used in structures of any kind. Typically, reinforcement elements are load bearing elements or, at least, load-sensitive elements of the structure. Therefore, reinforcement elements have been equipped with sensors to monitor the actual condition of structures or to detect creeping behavior resulting in changes of the structure or even in a loss of structural integrity. Such monitoring is especially important for protective structures like dykes, dams or the like since collapse of the structure may have severe or even catastrophic consequences.

A recent type of reinforcement elements are geotextiles. Geotextiles as such are known, e.g., from DE 197 46 052 C2. For example, geosynthetic clay proofing sheets without a monitoring function are mostly used at the present time for dyke renovations. These sheets can connect not filter-stable soil layers safe against erosion or may be used as a water-side sealing, but cannot be employed for dyke monitoring.

DE 195 06 180 C1 and DE 295 21 732 U1 describe a method and a device which makes it possible to check and monitor the condition of dykes, dams and weirs on the basis of distributed temperature measurement by means of a fiber-optic sensor cable. Laser radiation is coupled into the sensor cable, and on the basis of a transit-time and intensity evaluation of the Raman-backscattered laser radiation a distributed temperature measurement can be performed. When an anomaly in temperature distribution is detected, a dyke leakage is detected and the location of this anomaly can be determined.

Optical fibers as deformation sensors in geotextiles are offered by the company Polyfelt (www.polyfelt.com) with the product "Geodetect". This geoplastic is based on what are known as fiber Bragg grating (FBG) sensors. These FBG sensors are chain sensors which can be incorporated into the fiber at specific local points and which possess a measurement length of a few millimeters. FBG sensors of this type carry out only point measurement and, therefore, do not give sufficiently reliable information on geomats laid over a large area. In other words, FBG sensors deliver only local information on the mechanical behavior but the deformation behavior of large measurement areas cannot be simply deduced therefrom.

BRIEF DESCRIPTION OF THE INVENTION

In view of the above, a reinforcement element including at least one sensor fiber adapted for strain measurements based on stimulated Brillouin scattering within said sensor fiber is provided.

Further aspects, advantages and features of the present invention are apparent from the dependent claims, the description and the accompanying drawings.

According to another aspect of the invention, a method of manufacturing a geotextile is provided, the method including the step of embedding at least one sensor fiber adapted for strain measurements based on stimulated Brillouin scattering within said sensor fiber between two layers of non-woven fabric.

According to a further aspect of the invention, a system for monitoring strain within a structure is provided, the system including a reinforcement element including at least one sensor fiber adapted for strain measurements based on stimulated Brillouin scattering within said sensor fiber, a pump laser for coupling in laser radiation of a pump frequency into said at least one sensor fiber, a Stokes laser for coupling in laser radiation of a Stokes laser radiation into said at least one sensor fiber, wherein the pump frequency and the Stokes frequency are different from one another and wherein the frequency difference between the pump and Stokes frequencies is within the range of the acoustic wave frequency within said sensor fiber, a light sensor adapted to obtain a stimulated Brillouin backscattering signal, and a network analyzer adapted for determining the complex transfer function of the sensor fiber to determine a spatially resolved strain measurement.

According to still another aspect of the invention, a method for monitoring strain within a structure is provided, the method including the steps of providing at least one system as described above, coupling in laser radiation of a pump frequency into a first end of said at least one sensor fiber of said system, coupling in laser radiation of a Stokes laser radiation of a Stokes frequency into an opposite second end of said at least one sensor fiber, wherein the pump frequency and the Stokes frequency are different from one another and wherein the frequency difference between the pump and Stokes frequencies is within the range of the acoustic wave frequency within said at least one sensor fiber, obtaining a stimulated Brillouin backscattering signal, and determining the complex transfer function of the sensor fiber to determine a spatially resolved strain measurement signal.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

According to embodiments, a reinforcement element is provided. The reinforcement element includes at least one sensor fiber adapted for strain measurements based on stimulated Brillouin scattering within said sensor fiber. Since the complete fiber body serves as the sensor, a fully distributed measurement along the reinforcement element is enabled compared to the local quasi-distributed measurements in an FBG sensor. Thus, the reinforcement element allows detection of strain within a structure, e.g. due to abnormal load conditions, loss of structural integrity, or an emergency case. Also, slow continuous changes of the structure, also called a creep behavior of the structure, can be detected by the sensor. Due to the measurement principle applied, namely the stimulated Brillouin scattering process, it is possible to directly detect strain applied to the sensor fiber. While the prior art sensors based on Raman scattering can only detect temperature variations along the sensor fiber, the stimulated Brillouin scattering sensors can also measure the strain applied to the sensor fiber and output a strain-dependent signal which is spatially resolved over the length of the sensor fiber. Typically, spatial resolution as high as 0.5 m to 1 m can be obtained for long sensor fibers of several kilometers length. Also, accurate strain measurements with a resolution in strain of less than 0.1% and even as high as 0.05% or higher can be obtained. In addition, the stimulated Brillouin scattering sensor fiber is also capable to perform a spatially resolved temperature measurement with a temperature resolution of about 1K to 2K. Thus, the reinforcement element according to the present invention allows detailed spatially resolved monitoring of a structure with respect to strain and temperature. It will be understood by those skilled in the art that two or more sensor fibers may be used in the same reinforcement element to enhance redundancy and/or spatial resolution of the monitoring. Based on strain monitoring, a structural condition of the structure and/or the structural integrity of the structure and/or creeping effects within the structure and/or a water flow within the structure and/or an emergency situation of the structure can be detected.

Typically, the sensor fiber used in embodiments is a single-mode sensor fiber. A single-mode sensor fiber is an optical fiber designed to carry only one mode. Single-mode optical fibers are also called monomode optical fibers, single-mode optical waveguides, or unimode fibers. Unlike multi-mode optical fibers, single mode fibers exhibit extremely low dispersion resulting from multiple spatial modes. Single mode fibers are also better at retaining the fidelity of each light pulse over long distances than multi-mode fibers. For these reasons, single-mode fibers can have a higher bandwidth than multi-mode fibers.

The reinforcement elements to which the sensor fiber may be applied, including but not limited to, flexible or stiff geosynthetic materials, an anchor for anchoring a structure in the ground, a guard net for guarding a rock fall area or an avalanche area, a carrying net for carrying heavy loads, a trawl net, a rope, or a security fence. For example, the flexible or stiff geosynthetic material may be applied in rock-burst prone regions, typically mining regions, to allow forecasting of rock bursts which may cause considerable damage to buildings or roads. In another example, the reinforcement element carrying the sensor is an anchor within a dam so that the strain acting on the anchor, especially in the region of the base of the dam, can be detected. In still another example, the reinforcement element equipped with the sensor is a guard net which is applied in a rock fall area or an avalanche area so that rocks or snow caught by the guard net can be detected due to a change in strain. Similarly, the reinforcement element may be a rope which is used for securing rocks or similar objects having potential danger of falling down. In yet another example, the reinforcement element equipped with the sensor is a carrying net for carrying heavy loads, e.g. a net for air-transporting tanks or the like, which can be monitored during transport to detect excessive strain. According to another example, the reinforcement element equipped with the sensor is a trawl net which can detect the amount of fish caught in the net. In still another example, the reinforcement element equipped with the sensor is a security fence, e.g. for guarding a nuclear power plant or an army base. Due to the strain detector included in the security fence, it is possible to detect intruders climbing over the fence or damaging the fence.

It will be understood by those skilled in the reinforcement elements and systems according to embodiments may be embedded into structures during initial construction thereof as well as during renovation or rehabilitation of already existing structures. For example, reinforcement elements and systems according to embodiments may be embedded into dykes during heightening of the dyke top.

According to another embodiment, the reinforcement element is a geotextile. In the following, the invention will be exemplified with reference to geotextiles. However, it should be understood by those skilled in the art that explanation not specifically related to geotextiles are also valid for other reinforcement elements, and especially to the reinforcement elements listed above. Therefore, the following explanations related to geotextiles should be understood as a non-limiting exemplary description of embodiments.

Figure 1:
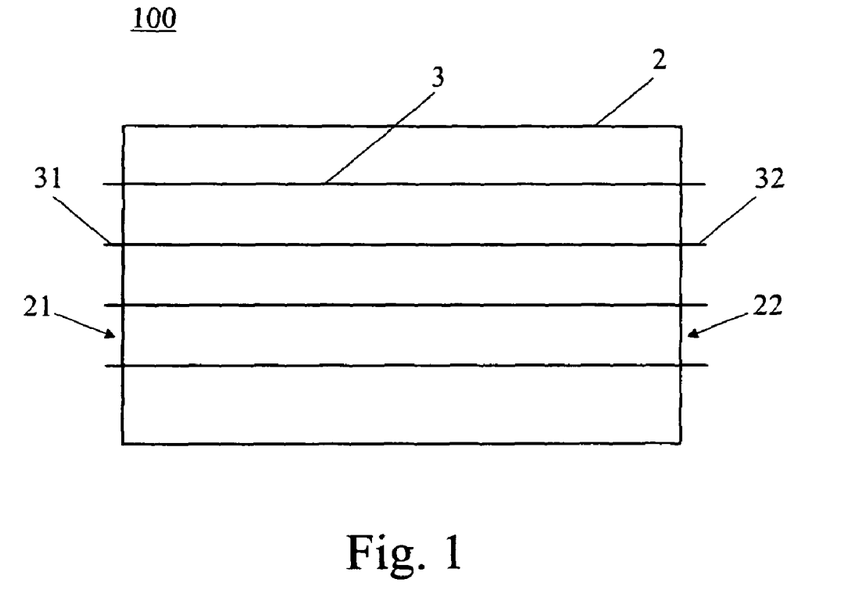
FIG. 1 shows a schematic view of a reinforcement element according to an embodiment.

FIG. 1 shows a schematic view of a reinforcement element according to an embodiment. Therein, a reinforcement element 2 is formed as a geotextile. The geotextile is in the form of a rectangular mat and having a typical longitudinal extension of 10 m to 100 m, more typically between 20 m to 50 m. Several single-mode optical sensor fibers 3 are extending across the geotextile in a substantially straight manner. The sensor fibers 3 are arranged substantially parallel to each other and are aligned with the lateral edges of geotextile 2. According to the embodiment shown in FIG. 1, the longitudinal length of sensor fibers 3 is greater than the longitudinal dimension of geotextile 2. Thus, sensor fibers 3 extend beyond a first longitudinal end 21 and/or a second longitudinal end 22 of geotextile 2. The extensions 31, 32 of sensor fibers 3 can be used to couple sensor fibers 3 to lasers and/or measurement apparatus or to connect sensor fibers 3 to corresponding sensor fibers of adjacent geotextiles (not shown) to extend the overall length of the sensor fibers.

As mentioned above, the optical sensor fibers 3 are integrated as sensors into geotextile 2, preferably into non-woven Raschel knitted fabrics, in one operation. Typically, the optical fibers are encased with materials, such as aramid or glass fibers, by means of the KEMAFIL® method for protection against overstresses, and are then integrated into the geotextile surface. Typically, the optical fibers are protected towards the right side of the knitted fabric by means of non-woven fabric, and the optical fibers are protected towards the left side of the knitted fabric by means of binding elements of the ground and weft threads to protect the optical fibers. Typically, the embedding of the fibers in the textile process for producing the geotextile surface takes place between two bonded webs or other geoplastic webs. Typically, the optical fibers are incorporated in the direction of production or in the transverse direction of the geotextile. As described above, the optical fibers are typically slightly longer than the textile structure, that is to say they have a material reserve.

The above described arrangements according to embodiments overcome some of the disadvantages associated with the prior art. For example, limitation of measurement-value detection to only specific local areas in FBG sensors, such as, for example, in the product "Geodetect". Thus, the installation of a multiplicity of costly chain sensors is avoided. The costs per measuring point are thereby considerably reduced. Furthermore, embodiments not only allow detection of, e.g., the settling behavior of soil masses but also erosion.

Figure 2:
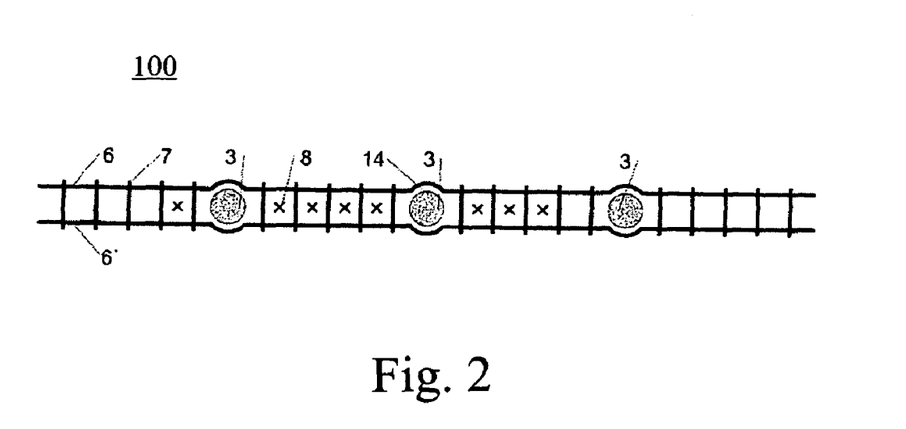
FIG. 2 shows a cross-sectional view of the embodiment shown in FIG. 1.

FIG. 2 shows a cross-sectional view of the embodiment shown in FIG. 1 showing the set-up of the textile structure for embedding the sensor fiber 3 between two non-woven fabric layers 6, 6'. For improved protection of the sensor fibers 3, it is advantageous to embed these fibers between two non-woven fabric layers 6, 6' in the region of non-woven fabric channels 14. The connection 7 of the non-woven fabric layers or nonwovens may be carried out in a known way by needling, knitting, hydrodynamic consolidation or thermal consolidation. Depending on the tendency of the sensor fibers to deformation, it may also be advantageous to introduce additional tension elements 8 consisting of low-extension fibers and also transverse weft threads 9 for load absorption, in order, particularly while the geotextile web is being laid, to avoid damage to the sensor fiber.

Figure 3:
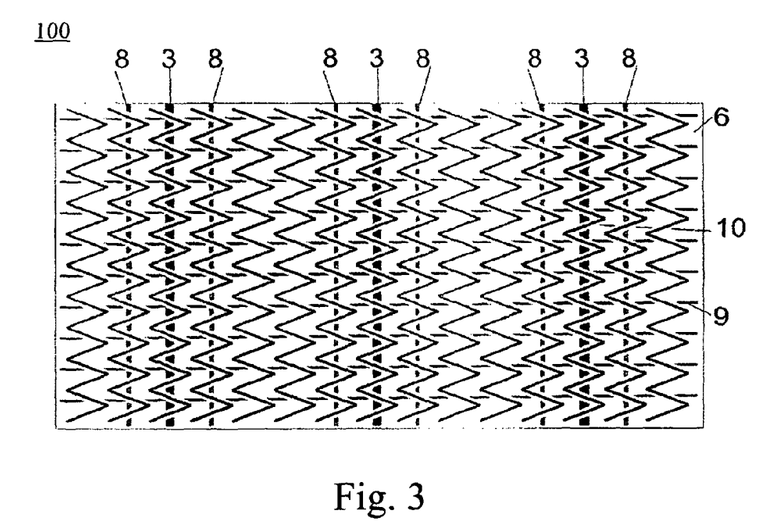
FIG. 3 shows a schematic view of a reinforcement element according to another embodiment.

FIG. 3 shows a schematic view of a reinforcement element according to another embodiment. Therein, a top view of the left side of the cloth is shown for an alternative exemplary embodiment with the use of only one non-woven fabric layer and the binding of the sensor fibers by means of the underlaying of a tricot weave.

The structure according to FIG. 3 is produced as a biaxially reinforced non-woven fabric. The non-woven fabric layer 6 is reinforced in the longitudinal direction by the stretched-out threads 8 acting as tension elements, and in the transverse direction by load-absorbing transverse weft threads 9. The sensor fibers 3 are incorporated as a stay weft and are tied off by the underlaying of the tricot weave 10. In this embodiment, the sensor fibers run in slightly longer than the bonded fabric web supplied in a stretched out condition, in order to provide an extension reserve for normal load situations of the geotextile for the sensor and so as not to damage the sensor when the surface is in normal use.

Figure 4:
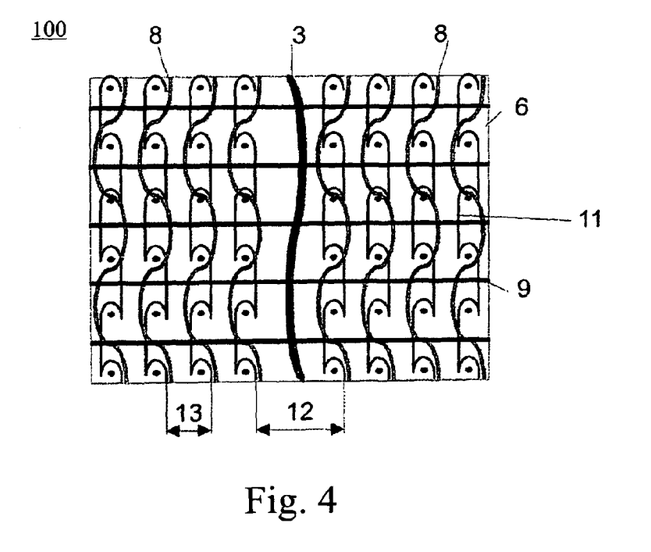
FIG. 4 shows a schematic view of a reinforcement element according to an even further embodiment.

FIG. 4 shows a schematic view of a reinforcement element according to an even further embodiment. Therein, a further structural set-up with only one non-woven fabric layer and with a tie-off of the sensor fibers by means of the transverse threads is shown. The tension elements 8 running in the longitudinal direction (production direction) and the transverse weft threads 9 are secured to the non-woven fabric layer 6 by the underlaid sections 11 of the fringe. In the region 12, the spacing of the knitted stitch wales 13 is increased. The sensor fibers 3 are tied off in the direction of the left side of the weave by the transverse weft threads 9. The sensor fibers 3 run, free of kinks, into the knitted fabric in the region 12 with a slight "overlength".

Figure 5:
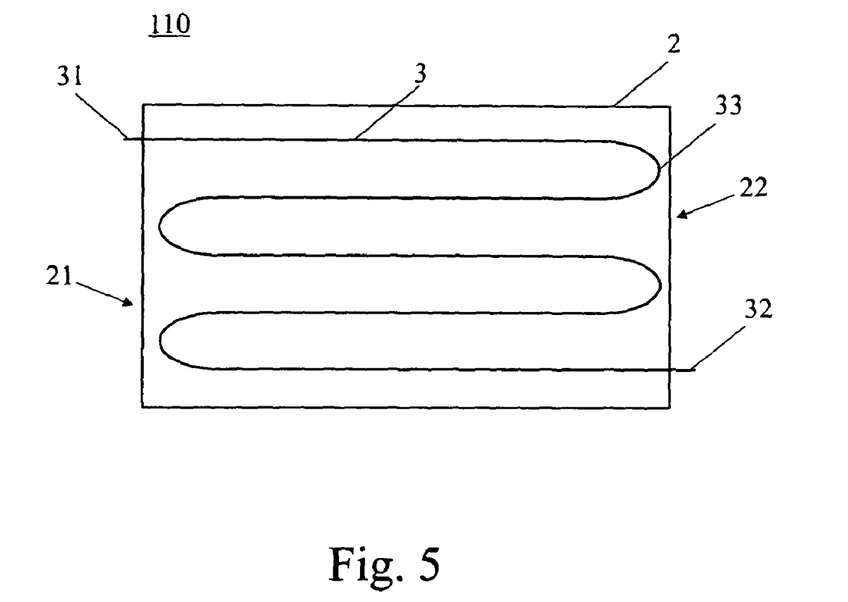
FIG. 5 shows a schematic view of a reinforcement element having a meandering sensor fiber according to an embodiment.

FIG. 5 shows a schematic view of a reinforcement element having a meandering sensor fiber according to an embodiment. In the configuration 110, the sensor fiber 3 enters the geotextile mat 2 at a first longitudinal edge 21 and exits the geotextile mat 2 at the opposite longitudinal edge 22. Extensions 31, 32 of the sensor fiber extend beyond the first and second edges 21, 22, e.g. for connecting sensor fiber 3 to corresponding sensor fibers of adjacent geotextile mats. Sensor fiber 3 extends within geotextile mat 2 in a meandering manner, i.e. sensor fiber 3 includes several turns 33 in which the direction of sensor fiber 3 changes so that sensor fiber 3 runs back and forth between the first and second longitudinal edges 21, 22. It will be understood by those skilled in the art that any suitable number of turns 33 may be used for the meandering sensor fiber inlay.

Figure 6:
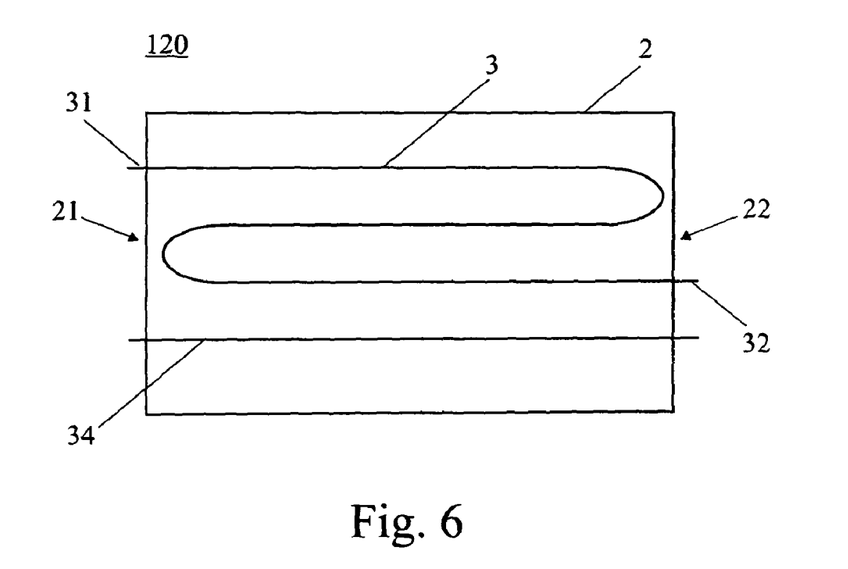
FIG. 6 shows a schematic view of a reinforcement element having a meandering sensor fiber according to another embodiment.

FIG. 6 shows a schematic view of a reinforcement element having a meandering sensor fiber according to another embodiment. In this configuration 120, the sensor fiber 3 has a similar configuration as in the embodiment shown in FIG. 5. However, a further sensor fiber 34 extends substantially straight between the first and second longitudinal edges 21, 22 of the geotextile mat 2. Further sensor fiber 34 is also called a return fiber, the function of which will be explained below with reference to FIG. 9.

In the above described embodiments of the reinforcement element, the one or more sensor fibers 3 included in the reinforcement elements 100, 110, 120 do not intersect with themselves or with each other. However, it will be understood by those skilled in the art that the scope of the present invention also embraces embodiments in which two or more fibers are arranged within the reinforcement element so that these elements intersect each other. For example, a first sensor fiber may extend substantially in a longitudinal direction of the reinforcement element and a second sensor fiber may extend substantially in a transverse direction of the reinforcement element. Thus, the first and second sensor fiber intersect or cross each other at approximately right angles. For example, the sensor fibers shown in FIGS. 1 and 5 may be overlaid with a similar arrangement rotated about any suitable angle. Typically, the second fiber may be rotated about 90 degrees, 60 degrees, or 45 degrees but any other desired angle may also be selected. In such embodiments, the strain within the structure can be measured in different directions, e.g. along the length and height of a dyke. Thus, different changes within the structure can be detected.

Figure 7:
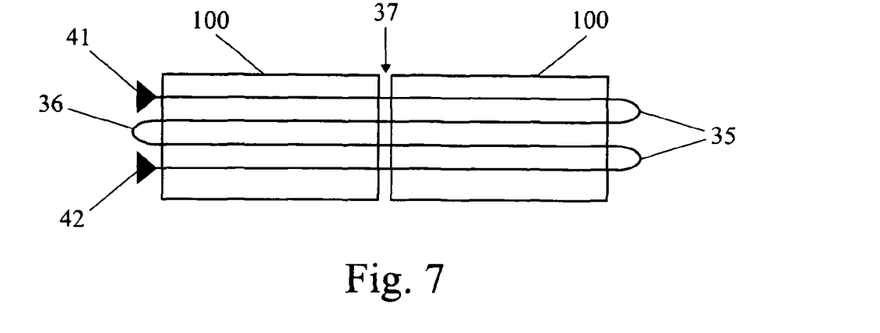
FIG. 7 shows a schematic view of a monitoring system according to an embodiment.

FIG. 7 shows a schematic view of a monitoring system according to an embodiment. Therein, two geotextile mats 100 having straight sensor fiber inlays are connected to each other in a connection portion 37. In connection portion 37, the extensions 32 at the second longitudinal end 22 of the left geotextile mat and the extensions 31 at the first longitudinal end 21 of the right geotextile mat are connected to each other to form longer sensor fibers. Typically, the sensor fibers are spliced together in connection portion 37, splicing being a standard connection method in optical communication technology. However, any other suitable equivalent method of connecting the sensor fibers can be applied. Although only two geotextile mats 100 are shown in FIG. 7, it will be understood by those skilled in the art that any suitable number of geotextile mats 100 may be connected to each other to form a geotextile reinforcement element of considerable length, e.g. of several kilometers, more typically between 2 km and 15 km. Furthermore, it is shown that adjacent extensions of the sensor fibers are connected to each other, e.g. by splicing, at the rear end 35 of the system and at the front end 36 of the system. Thus, the several separate sensor fibers of the individual geotextile mats 100 are formed into a single sensor fiber extending across the entire extension of the system. Moreover, the sensor fiber does not only extend across the system once but runs back and forth between the front and rear ends of the system several times in a meandering manner. Furthermore, coupling ports 41, 42 are provided at the front end of the system. Typically, coupling ports 41, 42 are used to couple in pump laser radiation and Stokes laser radiation and to couple out a backscattered signal produced by a stimulated Brillouin scattering process within the fiber. The measurement principle and the configuration of the pump and Stokes lasers as well as of the analyzing part will be described in more detail with reference to FIGS. 10 to 17.

Figure 8:
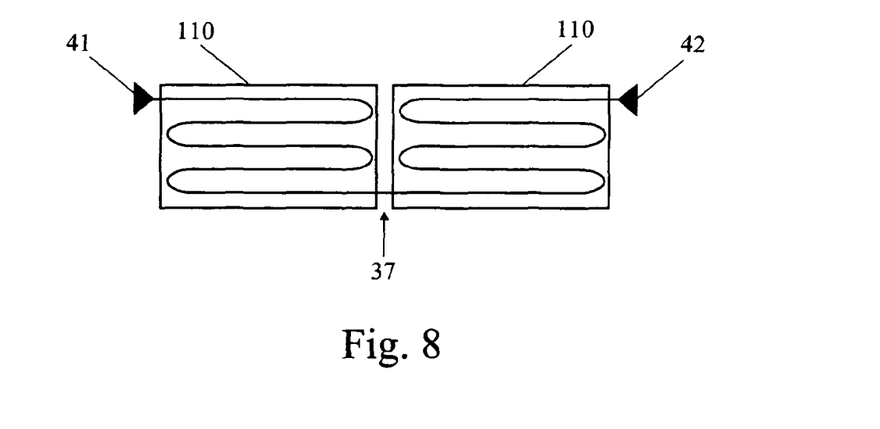
FIG. 8 shows a schematic view of a monitoring system according to another embodiment.

FIG. 8 shows a schematic view of a monitoring system according to another embodiment. In this system, the meandering configuration 110 of the sensor fiber inlay is used. In this configuration 110, the coupling ports 41, 42 are located at opposite ends of the system.

Figure 9:
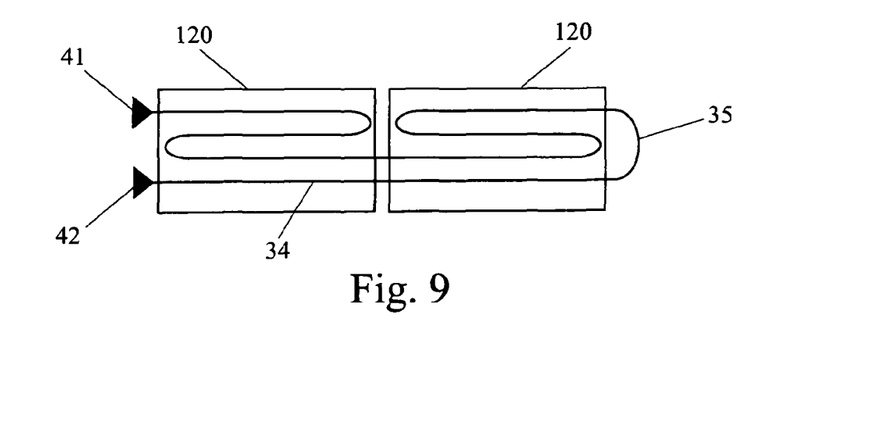
FIG. 9 shows a schematic view of a monitoring system according to an even further embodiment.

FIG. 9 shows a schematic view of a monitoring system according to an even further embodiment. In this system, the second meandering configuration 120 of the sensor fiber inlay is used. Similar to the embodiment shown in FIG. 8, the meandering sensor fiber extends from the front end to the rear end of the system. However, the extension of the meandering fiber exiting at the rear end of the system is connected to the return fiber 34 by a spliced connection 35. Thus, the sensor fiber is lead back to the front end of the system so that coupling port 42 can be located on the same side as coupling port 41. Accordingly, it is not necessary to have stations at both ends of the system. Furthermore, both coupling ports 41, 42 may be integrated in one component.

It will be understood by those skilled in the art that, further to the above described configurations, the at least one sensor fiber can be arranged within the geotextile to have a fiber length reservoir so that the sensor fiber can extend if strain is applied to the geotextile. For example, the sensor fiber may be arranged in a spiraling manner or one or more loops of the sensor fiber may be included within each of the geotextile mats.

Figure 10:
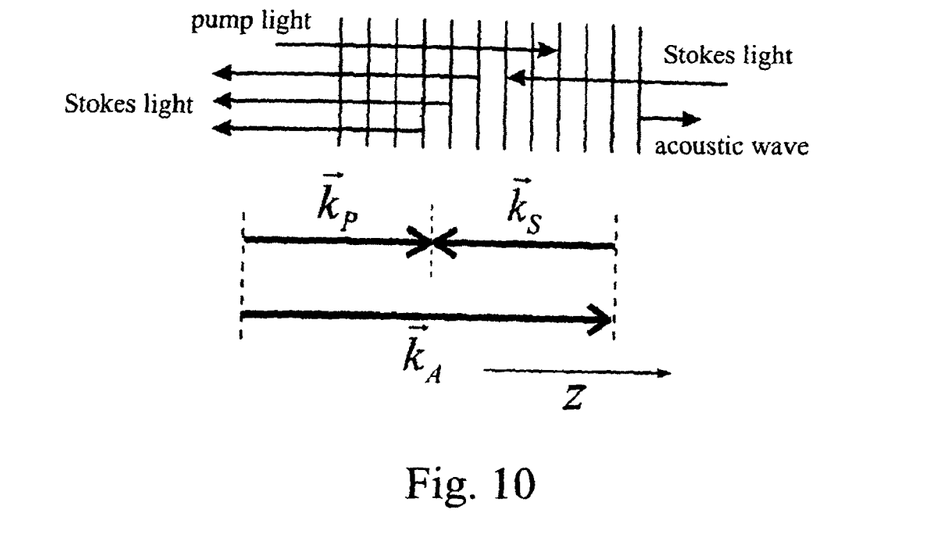
FIG. 10 is a schematic representation explaining the measurement principle based on stimulated Brillouin scattering.
Figure 11:
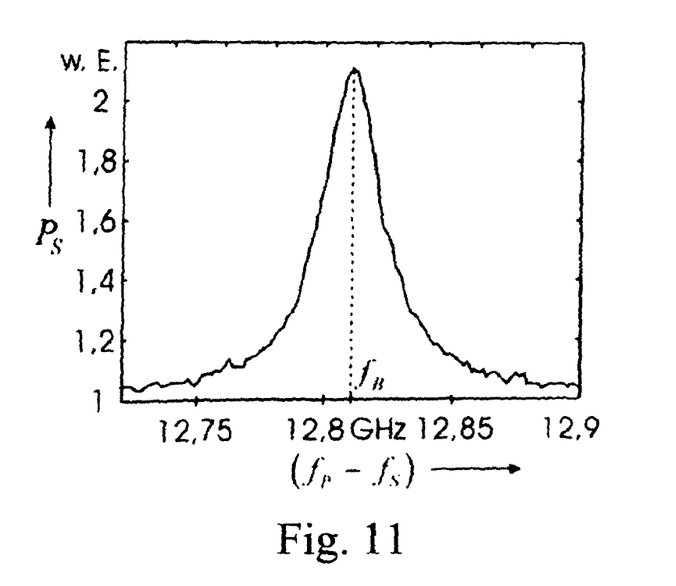
FIG. 11 shows Brillouin gain spectrum measured in a single-mode sensor fiber.

FIG. 10 is a schematic representation explaining the measurement principle based on stimulated Brillouin scattering. Stimulated Brillouin scattering is a dominant nonlinear effect in single-mode optical fibers if laser radiation of a small bandwidth and high or medium power is coupled into the fiber. Stimulated Brillouin scattering is the scattering or reflection of laser radiation at an acoustic wave created within the optical fiber. For example, the frequency of the acoustical wave is about 13 GHz. Such an acoustical wave can be generated by interfering two counterpropagating light waves of opposing wave vectors and having a frequency difference in the range of the acoustical wave. For example, so-called pump light is coupled in at one end of the fiber and so-called Stokes light is coupled in at the opposite end of the fiber. The frequency of the Stokes light is shifted down about, e.g., 13 GHz with respect to the frequency of the pump light. As shown in the lower part of FIG. 10, the wave vectors $k_P$ and $k_S$ of the pump and Stokes waves are opposite to each other. Due to the frequency difference, an acoustic wave is excited having a wave vector $k_A$. The acoustic wave causes coupling between the pump and Stokes waves so that power is transferred from the pump wave to the Stokes wave, i.e. the Stokes wave is amplified whereas the pump wave is attenuated. FIG. 11 shows the gain spectrum of this so-called Brillouin gain as a function of the frequency difference $f_P$–$f_S$. The gain spectrum has a Lorentz characteristic and is centered about the so-called Brillouin frequency $f_B$ of the fiber.

Figure 12:
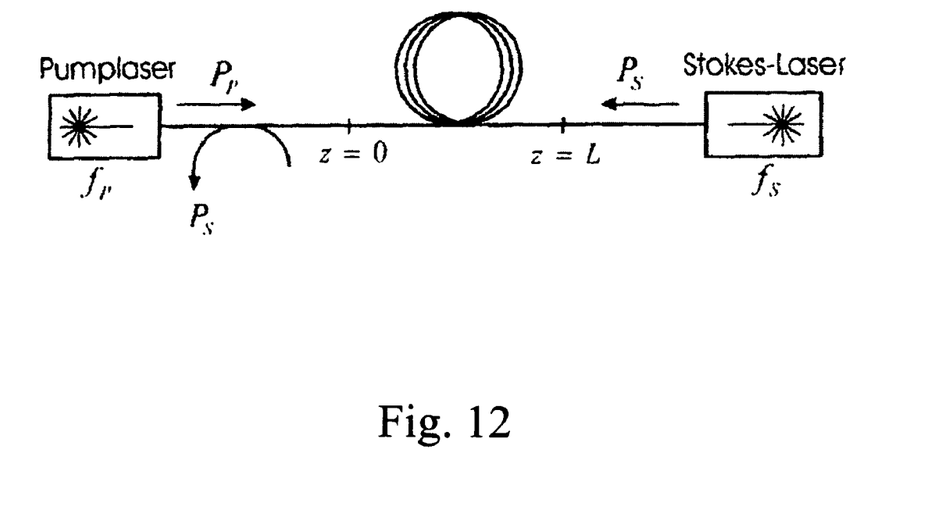
FIG. 12 shows a schematic view of a monitoring system according to an embodiment.

FIG. 12 shows a schematic view of a monitoring system according to an embodiment. The system includes a pump laser coupled to a first end of a sensor fiber and a Stokes laser coupled to an opposite end of the sensor fiber. The pump laser produces laser radiation of the pump frequency $f_P$ and the Stokes laser produces laser radiation of the Stokes frequency $f_S$, the laser radiation of both lasers being coupled into the fiber at the respective ends thereof with respective laser powers $P_P$ and $P_S$. At the end of the pump laser, the modulated power of the Brillouin-scattered Stokes light is detected. From this signal, a spatially resolved strain distribution along the sensor fiber can be obtained as will be explained in more detail below.

Figure 13:
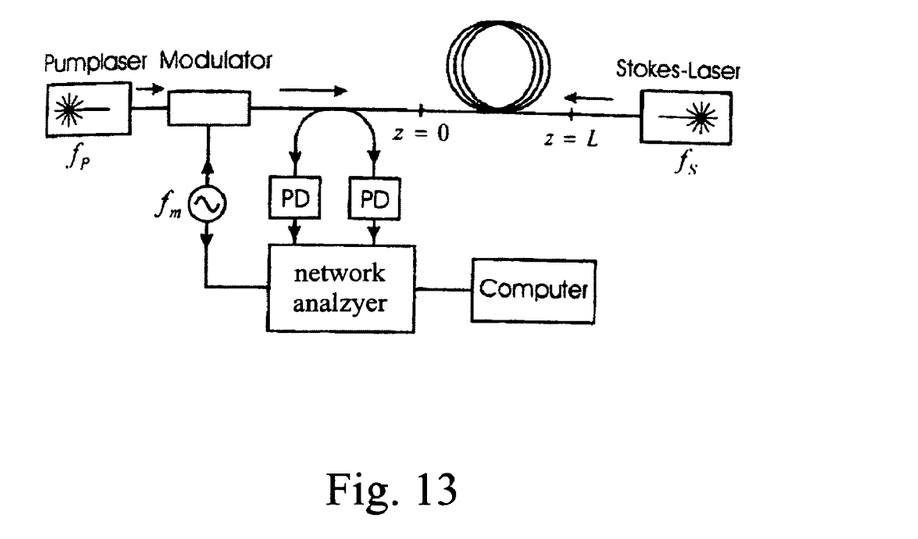
FIG. 13 shows a schematic view of a monitoring system according to another embodiment.

FIG. 13 shows a schematic view of a monitoring system according to another embodiment. The basic configuration of the system is the same as shown in FIG. 12. Furthermore, the system includes a pump light modulator adapted for modulating the amplitude of the pump laser radiation. In addition, the modulator is also capable of varying the frequency of the amplitude modulation. It is important to understand that the pump frequency $f_P$ is kept constant and only the frequency of the amplitude modulation is varied. Thus, rectangular amplitude pulses of the pump light can be probed in that the rectangular amplitude pulse is developed in higher harmonics of the pump frequency. Accordingly, lasers with relatively low power can be used in the present system, thus reducing the overall costs of the system. Furthermore, it is shown that photodetectors PD are used as light sensors for obtaining the Brillouin-scattering Stokes signal. The signals outputted by photodetectors PD are inputted into a network analyzer. The network analyzer analyzes the measurement signal with respect to a reference signal and, from this analysis, determines the complex transfer function of the sensor fiber. The complex transfer function is the subjected to an inverse Fast Fourier Transform (IFFT) to transfer the result from the frequency into the time domain. Thus, the pulse response of the sensor fiber can be obtained. From the pulse response, a spatially resolved strain measurement can be obtained by standard delay time analysis of the pulse. Of course, a reference signal adapted to the specific geometry of the fiber has to be provided to determine delay time differences. Typically, such a reference signal is measured on commissioning the system and, then, stored in a memory of the system. Furthermore, the system typically includes a Stokes light modulator adapted for modulating the frequency of the Stokes laser radiation. Thus, the frequency difference $f_P$–$f_S$ can be modulated to scan the Brillouin gain spectrum (see FIG. 11). It is an advantage of the above-described method and system that the measurement can be performed with a narrow bandwidth of only a few Hertz since only a single frequency is used. As a result, a very good signal-to-noise ratio is obtained resulting in high spatial resolution as well as high resolution in temperature. Furthermore, the above-described system does not require costly high-speed analyzers as they are required for analyzing pulse responses.

Figure 14:
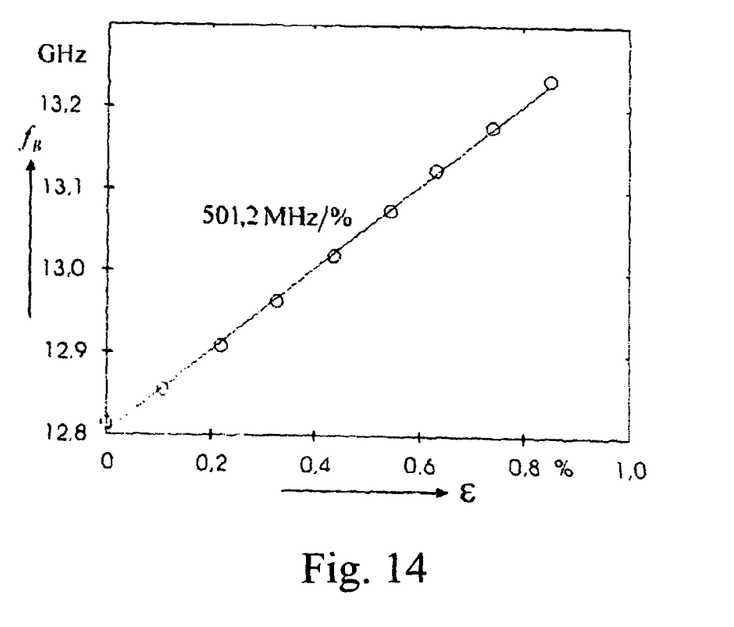
FIG. 14 shows the strain dependency of the Brillouin frequency of the sensor fiber.

FIG. 14 shows the strain dependency of the Brillouin frequency of the sensor fiber. Therefrom, it can be seen that the Brillouin frequency $f_B$ shifts about 501.2 MHz per 1% of strain exerted onto the sensor fiber. Accordingly, a mechanical deformation of the sensor fiber due to strain can be detected by a shift in the Brillouin frequency $f_B$. The shift itself can be detected by scanning the Brillouin gain spectrum to find the maximum of the Lorentz curve, i.e. the Brillouin frequency $f_B$. The position of the strained portion of the sensor fiber can then be obtained from a delay time analysis of the pulse response.

Figure 15:
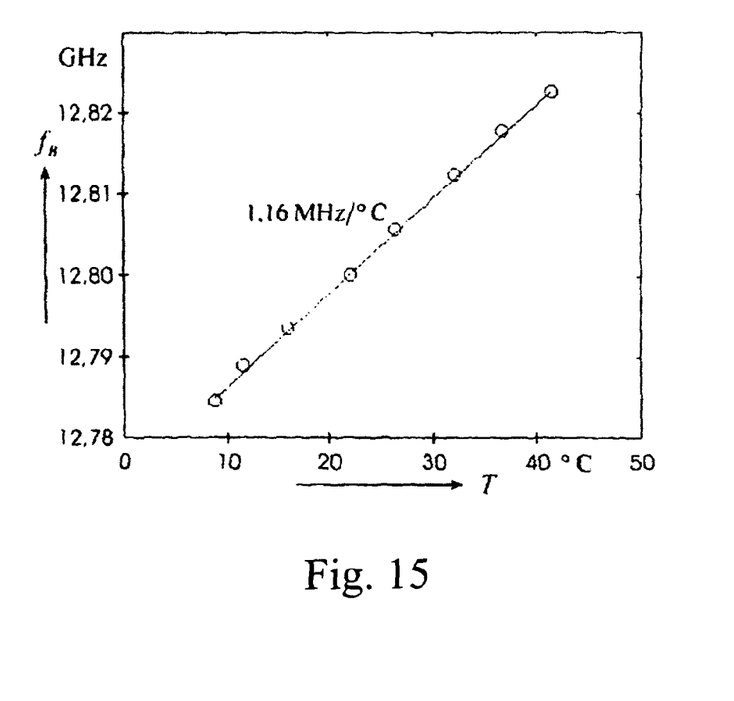
FIG. 15 shows the temperature dependency of the Brillouin frequency of the sensor fiber.

FIG. 15 shows the temperature dependency of the Brillouin frequency of the sensor fiber. Therefrom, it can be seen that the Brillouin frequency $f_B$ shifts about 1.16 MHz per 1° K temperature difference. Accordingly, the frequency shift due to temperature is about three orders of magnitude smaller than the strain-induced frequency shift. Therefore, the system according to embodiments is specifically advantageous for detecting strain in the sensor fiber. Furthermore, the temperature-induced effect can be distinguished from the strain-induced effect. For example, the FWHM of the Brillouin gain spectrum depends differently on temperature and strain. Thus, the system according to embodiments allows for spatially resolved measurement of strain and temperature across the entire length of the sensor fiber.

Figure 16:
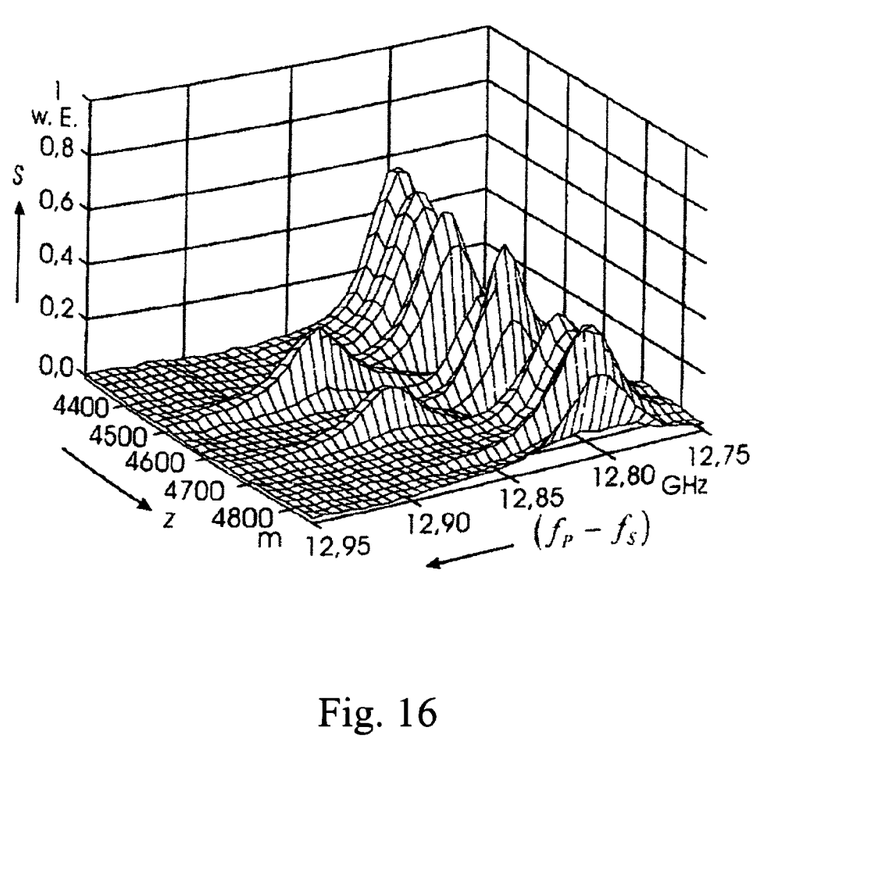
FIG. 16 shows a sensor signal obtained from measurements on a 11 km-long sensor fiber.

FIG. 16 shows a sensor signal obtained from measurements on an 11 km-long sensor fiber. Therein, the measured Brillouin gain spectra for ($f_P-f_S$) are shown for their respective position on the sensor fiber. It is apparent from FIG. 16 that the maximum of the Brillouin gain spectrum, i.e. the Brillouin frequency $f_B$, is shifted at two positions, namely at 4.5 kilometers and about 4.65 kilometers, thus indicating strain acting upon the sensor fiber at those positions.

Figure 17:
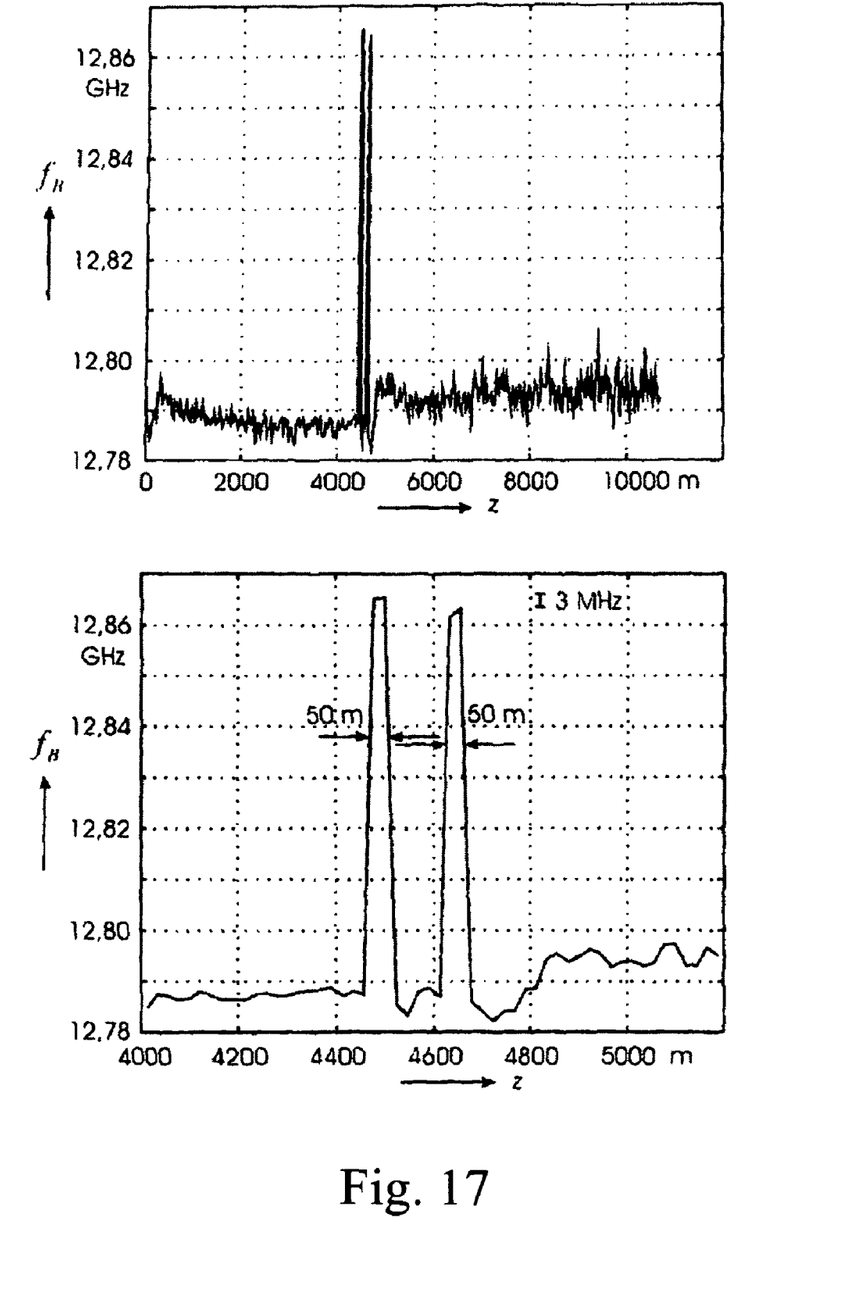
FIG. 17 shows the distribution of the Brillouin frequency along an 11 km-long sensor fiber.

FIG. 17 shows the characteristics of the Brillouin frequency across the same 11 km-long sensor fiber, wherein the lower diagram shows an enlarged view of the region of interest. Therefrom, it is apparent that a sharp raise in Brillouin frequency $f_B$ occurs at 4.5 kilometers and about 4.65 kilometers, thus indicating strain acting upon the sensor fiber at those positions.

By means of the measurement principle explained above, the present system provides an effective way of spatially resolved measurements of strain and, optionally, also temperature in reinforcement elements. Accordingly, the system can be advantageously applied for monitoring the actual condition of structures. In exemplary but not limiting examples, the system is used for the monitoring of a dyke, a dam, a bridge, a roadbed, a railway line, a building, a rock burst-prone region, a hillside, a tunnel, a ship's hull, an aircraft body, or an airfoil.

Figure 18:
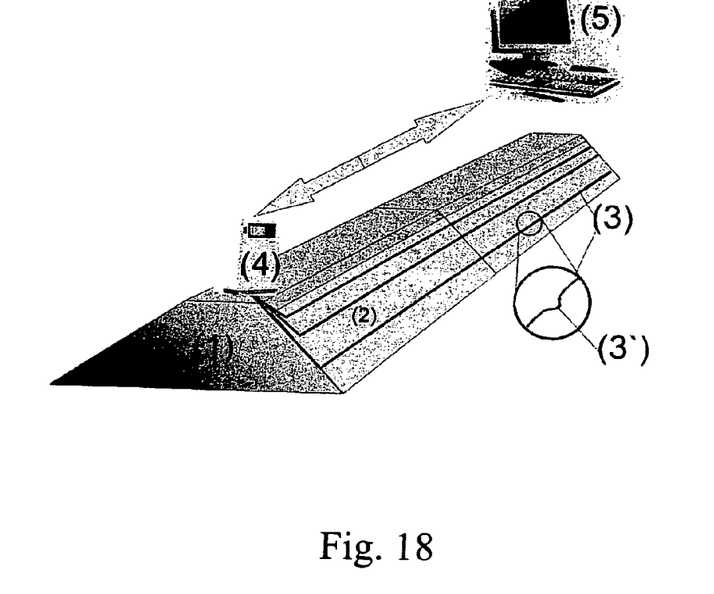
FIG. 18 shows a perspective view of a dyke being equipped with a system according to an embodiment.

FIG. 18 shows a perspective view of a dyke being equipped with a system according to an embodiment. As explained above, the system can be used to monitor a structural condition of the dyke and/or the structural integrity of the dyke and/or creeping effects within the dyke and/or a water flow within the dyke and/or an emergency situation of the dyke. In FIG. 1, a dyke 1 is reinforced with a geotextile 2 into which sensor fibers 3 of the above-described type have been integrated. A deformation 3' of the sensor fiber is detected as described above and processed by a measurement and evaluation apparatus 4. The measurement and evaluation apparatus 4 can communicate with a central monitoring station 5 in which a dyke safety officer observes the monitoring results. Additionally or alternatively, the monitoring results may also be transmitted by radio, WLAN, internet or any other suitable wire-bound or wireless communication means to the appropriate offices.

Figure 19:
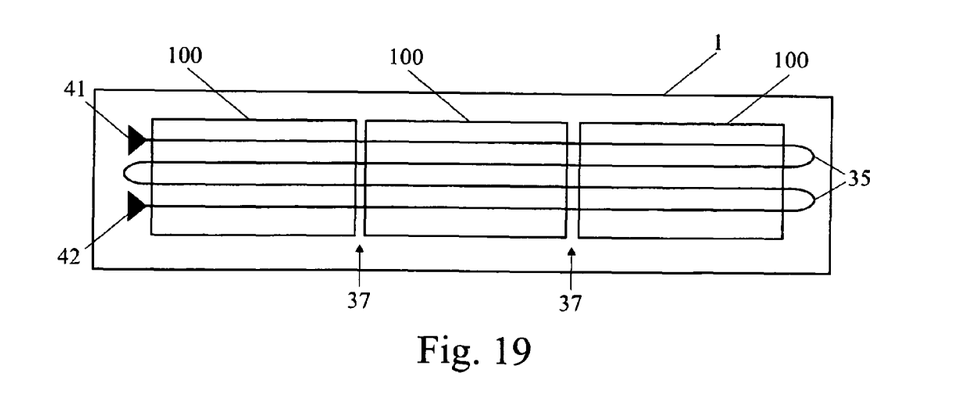
FIG. 19 shows a side view of a dyke being equipped with a system according to another embodiment.

FIG. 19 shows a side view of a dyke being equipped with a system according to another embodiment. The monitoring system used therein is similar to the system shown in FIG. 7.

In particular, the system includes a plurality of geotextile mats 100 each having a length of about 20 meters to 50 meters. The sensor fibers of the individual geotextile mats 100 are spliced together to form a single sensor fiber extending across the full length of the system, e.g. 5 km to 10 km. Since the sensor fiber is lead back to the front end of the system, both coupling ports 41, 42 can be located at the same end and may even be integrated in the same component. Since the system is safety relevant, a one or more sensor fibers may be included in the system for redundancy. For example, such additional fibers may shadow the trace of the main fiber so that comparable results can be achieved also with the redundant fibers.

Furthermore, it will be understood by those skilled in the art that typically a dyke is longer than 5 km to 10 km. Therefore, the dyke may include a plurality of such systems, wherein the systems are arranged successively along the longitudinal extension of the dyke.

A major increase in dyke safety is achieved when multifunctional geotextiles with an integrated sensor system are employed in dyke renovations. This geotextile system can afford the desired dyke strengthening and at the same time detect the different states of the dyke.

Furthermore, in a flood situation, sites of damage can be indicated continuously and, in a normal load state, periodically activatable online dyke monitoring is enabled. Measured data on the deformation of the textile structure (and consequently the dyke deformation) are detected and recorded in measuring stations which can be installed over long distances from one another.

According to the monitoring method according to embodiments, exact actual states of the dyke can be detected over kilometer-long measurement distances.

The use of relatively beneficial geoplastics introduced in building practice, in combination with an efficient monitoring technology, affords, for the above-mentioned dyke reinforcement measures, a considerable advantage, as compared with current monitoring and renovation concepts.

The use of the developed motor-functional geoplastics with integrated optical sensor fibers entails the following advantages: A geotextile system according to embodiments serves for the detection and continuous large-area monitoring of mechanical deformation, settling, erosion, temperature change and moisture penetration in the dyke. A plurality of geotextile systems may be arranged one behind the other and be interconnected into a measurement unit with a length of a few kilometers. Dyke monitoring may be performed at any desired time. Early risk detection and defense by automatic weak-point analysis and detection of any increase in damage is enabled. Automated collection of extensive, not merely local or linear, information (damage mapping) is provided. Observation of short-term and long-term variations (settlings, erosion, seepage) of the dyke can be performed by means of the same monitoring system. The system provides low operational costs due to automated (if necessary, even permanent) monitoring of very long dyke distances. Commercially obtainable cost-effective standard glass fibers may be used as sensor fibers. Economic benefits owing to the use of a combination of stabilizing geotextile and measuring means in one system can be obtained. No serious disturbance in dyke-building technology is induced since reinforcement and the monitoring system are built into the dyke in a single work step. Different geoplastic structures (with or without sensor fibers, with a different density of arrangement of sensor fibers in the geoplastic) according to the relevant type of dyke and to expected load situations can be combined with each other.

Furthermore, it should be understood that the embodiments may also be applied to steep coast regions for monitoring the condition of the steep coast.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for monitoring strain within a structure, comprising
   a reinforcement element comprising at least one sensor fiber adapted for strain measurements based on stimulated Brillouin scattering within said sensor fiber,
   a pump laser for coupling in laser radiation of a pump frequency into said at least one sensor fiber,
   a Stokes laser for coupling in laser radiation of a Stokes laser radiation into said at least one sensor fiber,
   wherein the pump frequency and the Stokes frequency are different from one another and wherein the frequency difference between the pump and Stokes frequencies is within range of acoustical phonons within said sensor fiber,
   a light sensor adapted to obtain a stimulated Brillouin-scattered signal, and
   a network analyzer adapted for determining the complex transfer function of the sensor fiber to determine a spatially resolved strain measurement.

2. The system of claim 1, further comprising a processor adapted to calculate the inverse Fast Fourier Transform (IFFT) of the complex transfer function.

3. The system of claim 1, further comprising a pump light modulator adapted for modulating the amplitude of the pump laser radiation.

4. The system of claim 1, further comprising a Stokes light modulator adapted for modulating the frequency of the Stokes laser radiation.

5. The system of claim 1, comprising a plurality of reinforcement elements, wherein the at least one sensor fibers of adjacent reinforcement elements are connected to each other so that at least one sensor fiber extending across two or more of the plurality of reinforcement elements is formed.

6. The system according to claim 5, wherein the at least one sensor fibers of adjacent reinforcement elements are spliced together.

7. The system according to claim 6, wherein the reinforcement element is a geotextile and the at least one sensor fibers of adjacent geotextiles are spliced together at portions of the sensor fibers extending beyond opposing edges of the adjacent geotextiles.

8. The system according to claim 5, wherein each reinforcement element comprises several sensor fibers and the several sensor fibers of the plurality of reinforcement elements are connected so that a single sensor fiber extending across the longitudinal length of the plurality of reinforcement elements is formed.

9. The system according to claim 8, wherein the single sensor fiber extending across the longitudinal length of the plurality of reinforcement elements has a first end coupled to the pump laser and the light sensor, and a second end coupled to the Stokes laser.

10. The system according to claim 9, wherein the first and second ends of the single sensor fiber extending across the plurality of reinforcement elements are located at the same end of the longitudinal length of the plurality of reinforcement elements.

11. The system according to claim 5, wherein the at least one sensor fiber extends over a longitudinal length in the range from 2 km to 15 km.

12. The system according to claim 1, wherein the system is comprised in a dyke, a dam, a bridge, a roadbed, a railway line, a building, a rock burst-prone region, a hillside, a tunnel, a ship's hull, an aircraft body, an airfoil, a trawl net, a rope, a security fence.

13. A dyke comprising at least one system according to claim 1 and being adapted to monitor a structural condition of the dyke and/or the structural integrity of the dyke and/or creeping effects within the dyke and/or a water flow within the dyke and/or an emergency situation of the dyke.

14. The dyke according to claim 12, wherein the dyke comprises a plurality of said systems, wherein said systems are arranged successively along the longitudinal extension of the dyke.

15. The dyke according to claim 13, wherein the longitudinal extension of each system is in the range from 5 km to 10 km.

16. A method for monitoring strain within a structure, comprising the steps of:
   coupling in laser radiation of a pump frequency into a first end of at least one sensor fiber of a reinforcement element,
   coupling in laser radiation of a Stokes laser radiation of a Stokes frequency into an opposite second end of said at least one sensor fiber,
   wherein the pump frequency and the Stokes frequency are different from one another and wherein the frequency difference between the pump and Stokes frequencies is within range of acoustical phonons within said at least one sensor fiber,
   obtaining a stimulated Brillouin-scattering signal, and
   determining the complex transfer function of the sensor fiber to determine a spatially resolved strain measurement signal.

17. The method of claim 16, further including the step of calculating the inverse Fast Fourier Transform (IFFT) of the complex transfer function.

18. The method of claim 16, further comprising the step of modulating the amplitude of the pump laser radiation.

19. The method of claim 16, further comprising the step of modulating the frequency of the Stokes laser radiation.

20. The method of claim 16, further comprising the step of determining a spatially resolved temperature measurement from the stimulated Brillouin backscattering signal.

21. The method of claim 16, wherein the structure is a dyke, a dam, a bridge, a roadbed, a railway line, a building, a rock burst-prone region, a hillside, a tunnel, a ship's hull, an aircraft body, an airfoil, a trawl net, a rope, a security fence.

* * * * *